United States Patent [19]

Miura et al.

[11] Patent Number: 4,861,688

[45] Date of Patent: Aug. 29, 1989

[54] ZINC-ALKALINE BATTERY

[75] Inventors: Akira Miura, Katano; Kanji Takata, Neyagawa; Ryoji Okazaki, Katano; Toyohide Uemura; Keiichi Kagawa, both of Takehara, all of Japan

[73] Assignees: Matsushita Electric Indus. Co. Ltd., Osaka; Mitsui Mining & Smelting Co., Ltd., Tokyo, both of Japan

[21] Appl. No.: 29,343

[22] Filed: Mar. 19, 1987

Related U.S. Application Data

[63] Continuation of Ser. No. 804,821, Dec. 5, 1985, abandoned.

[30] Foreign Application Priority Data

| Dec. 12, 1984 | [JP] | Japan | 59-262135 |
| Dec. 12, 1984 | [JP] | Japan | 59-262138 |
| Feb. 5, 1985 | [JP] | Japan | 60-20372 |
| Feb. 5, 1985 | [JP] | Japan | 60-20373 |
| Oct. 16, 1985 | [JP] | Japan | 60-230159 |
| Oct. 16, 1985 | [JP] | Japan | 60-230161 |
| Oct. 17, 1985 | [JP] | Japan | 60-231599 |

[51] Int. Cl.$^4$ .................................... H01M 4/40
[52] U.S. Cl. .................... 429/206; 429/229; 429/230
[58] Field of Search ............... 429/230, 229, 206

[56] References Cited

U.S. PATENT DOCUMENTS

| 4,376,810 | 3/1983 | Takeda et al. | 429/230 |
| 4,500,614 | 2/1985 | Nagamine et al. | 429/230 |
| 4,585,716 | 4/1986 | Chalilpoyil et al. | 429/206 |
| 4,735,876 | 4/1988 | Miura et al. | 429/206 |

FOREIGN PATENT DOCUMENTS

| 0003204 | of 1958 | Japan | 429/230 |
| 0022956 | of 1893 | United Kingdom | 429/230 |

Primary Examiner—Donald L. Walton
Attorney, Agent, or Firm—Stevens, Davis, Miller & Mosher

[57] ABSTRACT

This invention uses as the anode active material a zinc alloy containing Ni, at least one element selected from In, Pb, Ga and Cd and, optionally further, one element selected from Al, Mg, Ca, Ba and Sr for the anode of a conventional zinc-alkaline battery which employs zinc as the anode active material, aqueous alkaline solution as the electrolyte, and manganese dioxide, silver oxide, oxygen and so forth as the cathode active material. The use of such zinc alloy permits the reduction of the amount of mercury to be used for amalgamation of the anode zinc surface which is made for the purpose of corrosion inhibition, thereby enabling the provision of a low-pollution zinc-alkaline battery.

3 Claims, 1 Drawing Sheet

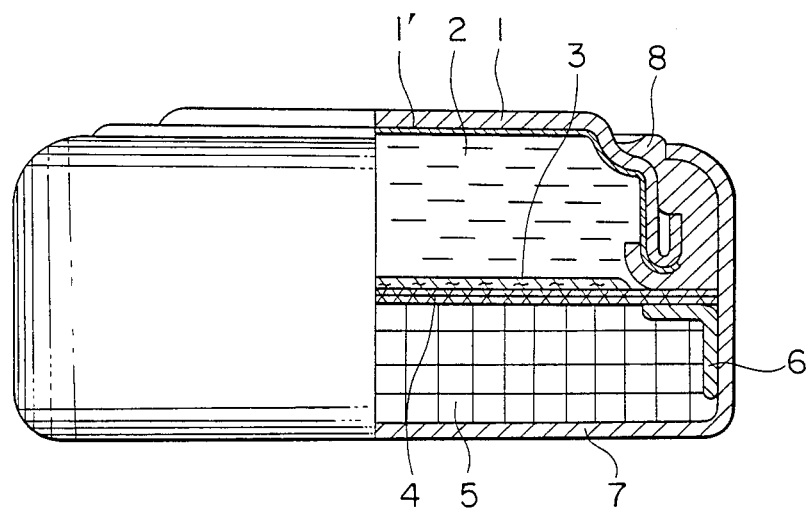

ZINC-ALKALINE BATTERY

This application is a continuation of application Ser. No. 804,821 filed Dec. 5, 1985, now abandoned

TECHNICAL FIELD OF THE INVENTION

This invention relates to an improvement for an zinc-alkaline battery using zinc as an anode active material, aqueous alkaline solution as an electrolyte, and manganese dioxide, silver oxide, mercury oxide, oxygen, or the like as a cathode active material. More particularly, it relates to a zinc-alkaline battery whch has enabled reduction of the amount of mercury to be used for amalgamation of the anode zinc surface by using for the anode a zinc alloy containing indium (In), lead (Pb), cadmium (Cd), gallium (Ga), nickel (Ni), aluminum (Al) and alkaline earth metals in a specified combination.

BACKGROUND OF THE INVENTION

As a problem common to zinc-alkaline batteries, there is raised the corrosion of the anode zinc caused by the electrolyte. Namely, zinc is so reactive in an alakli electrolyte as reacting with the electrolyte during long term storage, thereby undergoing self-corrosion in accordance with the following equation:

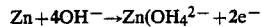

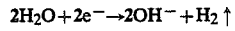

Hydrogen gas generated from the corrosion causes gas pressure in the battery to elevate, which involves the danger of causing leakage of electrolyte, bursting and the like. Accordingly, it has been hitherto adopted as an industrial technique to use amalgamated zinc powder which was prepared by adding about 5 to 10% by weight of mercury to zinc, to increase thus the hydrogen overvoltage and to suppress the corrosion to a practically allowable level. In recent years, however, it has been a increasing social demand to decrease the amount of mercury contained in a battery for lowering environmental pollution, and various studies have been conducted. For example, methods have been proposed which use zinc alloy powder formed by adding Pb, Ga, In etc. having high hdyrogen overvoltage into zinc to improve corrosion resistance and to decrease mercury concentration rate. These methods are effective to some extent in corrosion inhibition and give a zinc anode of nearly satisfactory corrosion resistance until a mercury concentration rate of about 3% by weight. However, when the mercury concentration rate is further decreased, zinc anodes obtained by these methods do not have sufficient corrosion resistance, and hydrogen gas generated during storage is accumulated on the surface or in the neighborhood of the anode active material, which causes the deterioration of discharge performance and can sometimes cause the expansion of the battery or the leakage of electrolyte, and thus they have a defect of insufficient storage property.

Further, it has been proposed, mainly with the view of improving manganese dry batteries, that a good corrosion inhibitory effect can be obtained by using for an anode a zinc alloy formed by adding In to zinc or zinc alloy [Japanese Patent application Kokoku (PostExam. Publn.) No. 3204/58]. The description of the above proposal includes cases wherein, besides In, one or more elements selected from Pb, Cd, Al, Mg, iron, chromium, calcium, mercury, bismuth, antimony, silver, silicon, nickel manganese etc. are added to zinc as an impurity or as an additive. However, it does not state clearly whether the above-mentioned various elements are each contained as in impurity or added as an effective additive except for the effectiveness of In and Pb used in combination as additive elements. Further, it neither states which element is effective for corrosion inhibition, nor shows the suitable amount to be added except those for In and Pb. Thus, no investigation has ever been made on the effect of combined use of these elements, particularly for zinc-alkaline battery, to find an effective zinc alloy composition.

BRIEF DESCRIPTION OF THE DRAWING

The attached drawing is a side view showing the cross section of a button-type silver oxide battery using the zinc alloy powder according to this invention as the anode active material.

List of numerical symbols referred to in the Drawing.
1 : Seal plate,
1': Copper plating layer of the inside surface of seal plate,
2: Zinc anode,
3: Electrolyte absorbent,
4: Separator,
5: Cathode,
6: Cathode ring,
7: Cathode can,
8: Gasket.

SUMMARY OF THE INVENTION

The principal object of this invention is to obtain a zinc-alkaline battery of low pollution and of excellent overall performance including discharge performance, storage property and prevention of alkaline leakage by using for the anode a zinc alloy containing In, Pb, Cd, Ga, Ni, Al and alkalne earth metals in a specified combination, thereby decreasing the amalgamation rate without causing the deterioration of the discharge performance and the corrosion resistance of the anode.

DETAILED DESCRIPTION OF THE INVENTION

More particularly, this invention is characterized by using a zinc alloy containing 0.01 to 0.5% by weight in total of at least one of In, Pb, Cd and Ga, 0.01 to 0.5% by weight of Ni, and optionally, further, 0.005 to 0.2% by weight of one of Al, magnesium (Mg), calcium (Ca), barium (Ba) and strontium (Sr) for the anode of the so-called zinc-alkaline battery, which uses zinc as the anode active material, an aqueous alkaline solution containing mainly potassium hydroxide, sodium hydroxide or the like as the electrolyte, and manganese dioxide, silver oxide, mercury oxide, oxygen or the like as the cathode active material. In this way, this invention has attained the realization of a zinc-alkaline battery of low pollution.

The effect of this invention, which has enabled the attainment of the above-mentioned object, may be understood, though as a presumption, as follows.

When molten zinc alloy is pulverized by injection method, its cooling velocity is very high, namely in the order of $10^2$ to $10^{3°}$ C./sec. Consequently, it can be considered that in a zinc alloy powder containing a proper amount of Ni as described later in the working examples, Ni will form a homogeneous mass with zinc although the solubility of Ni in zinc is small. Accordindgly, it can be presumed that when the zinc alloy is amalgamated from its surface, Ni, whose affinity for mercury is low, will suppress the diffusion of mercury into crystals and thus contribute to maintain the mercury concentration at the zinc alloy surface at a high level. On the other hand, however, Ni may possibly affect rather badly the compatibility of mercury with the zinc alloy surface. However, addition of at least one of In, Pb, Cd, and Ga, which have the effect of elevating the hydrogen over-voltage of zinc alloy, to zinc alloy with Ni, enables to form an amalgamated zinc alloy powder whose surface has been uniformly amalgamated and at the same to suppress the diffusion of mercury to the inner part of zinc alloy during storage. Thus, a zinc anode has been obtained which is of a low mercury concentration rate, namely 3% by weight or less, preferably 2.5 to 0.5% by weight, and generates little hydrogen gas even in long term storage. Further, all of Al, Mg, Ca, Ba and Sr suppress the diffusion of mercury to the inner part of zinc alloy because of their low affinity for mercury like Ni, and moreover, as their inherent function, have an effect of smoothening the surface of zinc alloy powder by preventing the formation of wrinkles which will usually develop when molten zinc alloy is made into powder by injection, thereby reducing the surface area. Accordingly, addition of any one of these elements to above-mentioned zinc alloy containing Ni and at least one of In, Pb, Cd and Ga improves the corrosion resistance further. Thus, a zinc anode of further lower mercury concentration rate, namely, preferably 1.5 to 0.2% by weight, has been obtained. However, since Al, Mg, Ca, Ba and Sr are all a baser metal than zinc, they tend to be corroded in preference to zinc in electrolyte. Accordingly, their amount to be added should be determined taking into consideration the balance between their favorable effect expected for corrosion resistance and their adverse effect. Addition of excessive amount of these elements has rather an adverse effect on corrosion resistance.

Thus, this invention has enabled to provide a zinc anode which is of a low mercury concentration rate, i.e. a mercury content of 3% by weight or less, and is excellent in storage property based on the experimental investigation of the combination of additional elements and their amounts to be added to zinc alloy used for an anode.

PREFERRED EMBODIMENT OF THE INVENTION

Hereunder will be described a process for producing a zinc alloy powder of this invention and an actual method of using the powder in a battery as the anode active material.

The zinc alloy powder of this invention can be obtained by a method which comprises injecting a molten metal with a compressed gas. More particularly, a zinc base metal of 99.997% purity is molten at about 500° C., and the respective given amounts of small pieces of elements to be added are added thereto and dissolved with stirring to produce a uniform molten alloy. The molten alloy is injected with compressed gas, such as compressed air, nitrogen gas or argon gas, of 4 kg/cm$^2$ pressure in order to pulverize the alloy. After being sieved to a particle size range of 20 to 150 mesh, the alloy powders are thrown into a 10% by weight aqueous potassium hydroxide solution, and then amalgamated by dropwise addition of a given amount of metallic mercury with stirring, and washed with water. After replacing the water with acetone followed by vacuum drying, an amalgamated zinc alloy powder is obtained. The amalgamated zinc alloy powder thus prepared is then added with stirring to a gel-like elecrolyte, which has been obtained by gelating an alkali electrolyte with a water-soluble high molecular substance such as carboxymethyl cellulose, sodium polyacrylate and the like, to give a uniformly dispersed gel-like anode, and a predetermined amount thereof is then filled into the anode part by means of a pump or the like to compose a battery.

EXAMPLE 1

The above-mentioned procedures for preparing the zinc alloy powder were followed to prepare various kinds of zinc alloy powder (these being referred to Examples (1) to (32)), in which the combinations of the added elements were Ni-In, Ni-Pb, Ni-Cd, Ni-Ga, Ni-In—Pb, Ni-In-Ga, Ni-In-Cd, Ni-Pb-Ga, Ni-Pb-Cd, Ni-Ga-Cd, and Ni-In-Pb-Cd-Ga, and the proportions of the added elements to zinc are in the range of 0.01 to 0.5% by weight for Ni, and 0.01 to 0.5% by weight in total for at least one of In, Pb, Cd and Ga. Further, there were prepared zinc alloy powders in which the added element was any one of Ni, In, Pb, Ga and Cd; zinc alloy powders in which alloy compositions were the same as mentioned above but the proportions of the added elements were outside the range of the working examples; and a powder containing no added element. These were referred to as

COMPARATIVE EXAMPLES (33) to (48).

These zinc alloy powders or zinc powders were amalgamated to a mercury concentration rate of 1.5% by weight and used to compose a button-type silver oxide battery shown in the Drawing. In the Drawing, 1 is a real plate made of stainless steel, whose inner face has been coated with copper plating 1'; 2 is a zinc anode manufactured by dispersing the amalgamated zinc powder according to this invention into a gel which has been prepared by gelating with carboxymethyl cellulose an electrolyte prepared by saturating aqueous 40% by weight solution of potassium hydroxide with zinc oxide; 3 is a cellulosic electrolyte absorbent; 4 is a separator made of porous polypropylene; 5 is a cathode made by pressmolding a mixture of silver oxide and graphite; 6 is a cathode ring made of iron plated with nickel; 7 is a cathode can made of iron, whose surface is plated with nickel; 8 is a gasket made of nylon and is compressed between the cathode can and the seal plate by bending the cathode can. The battery made on experimental basis had a diameter of 11.6 mm and a height of 5.4 mm. The weights of the amalgamated zinc alloy powders of the anodes were all fixed at one value of 193 mg each. In the following Table are shown the compositions of the zinc alloy of the manufactured battery, the average values of the discharge performance and the change in the total height of the battery after 1 month of storage at a temperature of 60° C. The discharge performance was expressed in terms of the duration of discharge when the discharge was conducted at 20° C. and at 510 Ω down to an end voltage of 0.9 V. Further, the batteries were allowed to stand at a temperature of 60° C. and a relative humidity of 90% for one month and then the state of electrolyte leakage was judged by visual observation. The number of batteries in which leakage was observed are also shown in the Table.

| Battery No. | Added elements and their content in zinc alloy (% by weight) | | | | Duration of discharge (hrs) (n = 3) | Change in total height of battery (μm) (n = 20) | Number of batteries showing leakage (n = 20) |
|---|---|---|---|---|---|---|---|
| 1 | Ni (0.01) | In (0.01) | | | 44 | −5 | 0 |
| 2 | Ni (0.01) | In (0.01) | | | 44 | −5 | 0 |
| 3 | Ni (0.01) | In (0.1) | | | 44 | −6 | 0 |
| 4 | Ni (0.01) | In (0.5) | | | 43 | −5 | 0 |
| 5 | Ni (0.05) | In (0.01) | | | 44 | −6 | 0 |
| 6 | Ni (0.05) | In (0.1) | | | 44 | −6 | 0 |
| 7 | Ni (0.05) | In (0.5) | | | 43 | −5 | 0 |
| 8 | Ni (0.1) | In (0.01) | | | 44 | −5 | 0 |
| 9 | Ni (0.1) | In (0.1) | | | 45 | −7 | 0 |
| 10 | Ni (0.1) | In (0.5) | | | 43 | −6 | 0 |
| 11 | Ni (0.5) | In (0.01) | | | 44 | −5 | 0 |
| 12 | Ni (0.5) | In (0.1) | | | 44 | −5 | 0 |
| 13 | Ni (0.5) | In (0.5) | | | 43 | −5 | 0 |
| 14 | Ni (0.01) | Pb (0.01) | | | 44 | −6 | 0 |
| 15 | Ni (0.1) | Pb (0.1) | | | 43 | −5 | 0 |
| 16 | Ni (0.5) | Pb (0.5) | | | 43 | −5 | 0 |
| 17 | Ni (0.01) | Cd (0.01) | | | 43 | −5 | 0 |
| 18 | Ni (0.1) | Cd (0.1) | | | 44 | −6 | 0 |
| 19 | Ni (0.1) | Cd (0.1) | | | 43 | −6 | 0 |
| 20 | Ni (0.01) | Ga (0.01) | | | 44 | −6 | 0 |
| 21 | Ni (0.1) | Ga (0.1) | | | 43 | −5 | 0 |
| 22 | Ni (0.5) | Ga (0.5) | | | 42 | −5 | 0 |
| 23 | Ni (0.01) | In (0.005) | Pb (0.005) | | 45 | −7 | 0 |
| 24 | Ni (0.05) | In (0.025) | Pb (0.025) | | 45 | −8 | 0 |
| 25 | Ni (0.1) | In (0.05) | Pb (0.05) | | 46 | −7 | 0 |
| 26 | Ni (0.5) | In (0.25) | Pb (0.25) | | 44 | −8 | 0 |
| 27 | Ni (0.1) | In (0.1) | Ga (0.1) | | 44 | −7 | 0 |
| 28 | Ni (0.1) | In (0.1) | Cd (0.1) | | 44 | −7 | 0 |
| 29 | Ni (0.1) | Pb (0.1) | Ga (0.1) | | 43 | −6 | 0 |
| 30 | Ni (0.1) | Pb (0.1) | Cd (0.1) | | 44 | −7 | 0 |
| 31 | Ni (0.1) | Ga (0.1) | Cd (0.1) | | 43 | −6 | 0 |
| 32 | Ni (0.1) | In (0.05) | Pb (0.05) | Cd (0.05) Ga (0.05) | 44 | −6 | 0 |
| 33 | Ni (0.01) | | | | 13 | +138 | 20 |
| 34 | Ni (0.1) | | | | 17 | +103 | 20 |
| 35 | In (0.01) | | | | 36 | +2 | 0 |
| 36 | In (0.1) | | | | 37 | +1 | 0 |
| 37 | Pb (0.1) | | | | 32 | +4 | 4 |
| 38 | Ga (0.1) | | | | 30 | +6 | 5 |
| 39 | Cd (0.1) | | | | | | |

-continued

| Battery No. | Added elements and their content in zinc alloy (% by weight) | | | Duration of discharge (hrs) (n = 3) | Change in total height of battery (μm) (n = 20) | Number of batteries showing leakage (n = 20) |
|---|---|---|---|---|---|---|
| 40 | Ni (0.1) | In (0.001) | | 33 | +3 | 3 |
| 41 | Ni (0.01) | In (0.001) | | 31 | +4 | 4 |
| 42 | Ni (0.01) | In (1.0) | | 30 | +6 | 4 |
| 43 | Ni (0.1) | In (0.001) | | 34 | +3 | 2 |
| 44 | Ni (0.5) | In (0.001) | | 34 | +3 | 3 |
| 45 | Ni (0.001) | In (0.1) | | 30 | +4 | 4 |
| 46 | Ni (1.0) | In (0.1) | | 27 | +9 | 6 |
| 47 | Ni (0.001) | In (0.001) | Pb (0.001) | 35 | +1 | 0 |
| 48 | Ni (1.0) | In (1.0) | Pb (1.0) | 31 | +1 | 0 |
|  | None | | | — | — | — |

With regard to the change in total height of the battery shown in above Table, it is usual that, after the battery has been sealed, the total height of the battery continues to decrease until he balance of stress among the individual components of the battery becomes stable with lapse of time. However, in batteries wherein a large amount of hydrogen gas is generated accompanying the corrosion of zinc anode, there is a stronger tendency for the total height of battery to be increased by the elevation of internal pressure of the battery which couteracts the abovementioned force of battery. Accordingly, the corrosion resistance of a zinc anode can be evaluated in terms of increase or decrease of the total height of the battery during storage. Further, when a battery uses a zinc anode of insufficient corrosion resistance, in addition to the increase of the total height of the battery, its resistance to electrolyte leakage is deteriorated owing to the rise of interval pressure of the battery and moreover its discharge performance is markedly deteriorated owing to the consumption of zinc due to corrosion, the formation of oxidized film on the zinc surface, and the inhibition of discharge reaction due to the presence of hydrogen gas in the battery. Thus, duration of discharge also depends largely on the corrosion resistance of the zinc anode.

Among Comparative Examples shown in the above Table, for the case (48) wherein no additional element is present, there is indicated no result for the duration of discharge, the change in total height of the battery, or the number of batteries showing leakage. This is because, when no additional element was used, the amount of hydrogen gas generated during storage was so large that there occurred extreme expansion in all of the batteries and, further, bursting or severe leakage of electrolyte occurred in some of the batteries. Thus, the use of a zinc anode whose mercury content has been simply decreased to a mercury concentration rate of 1.5% by weight results in an utterly unusable battery. Further, in Comparative Examples (33) to (39), wherein only one of the additional elements shown in the above Example is added, the batteries have each their problem. Particularly when Ni alone is added, a large amount of hydrogen gas is generated, and consequently the batteries expand extremely and leakage of electrolyte occurs in all of the batteries; moreover discharge performance after storage is also greatly deteriorated owing to self-exhaustion and the inhibition of discharge reaction by occluded gas. In cases of single addition of any one of In, Pb, Ga and Cd, which are additive elements having an effect of elevating the hydrogen overvoltage of zinc alloy, although the evolution of hydrogen gas during storage is relatively small and the expansion of the battery is also small, leakage occurs in some of the batteries and also the duration of discharge is short. Thus, the mere addition of a single element of Ni, In, Pb, Ga, or Cd does not give, at a low mercury concentration rate of 1.5% by weight, an anode which is excellent both in corrosion resistance and in discharge performance even after storage. On the other hand, zinc alloys (1) to (32) shown in the working examples, which contain Ni in the range of 0.01 to 0.5% by weight and at the same time at least one element of In, Pb, Ga and Cd in the range of 0.01 to 0.5% by weight in total, exhibit remarkable combined effects, are excellent both in corrosion resistance and discharge performance, causes no leakage of electrolyte, and thus show practically satisfactory characteristics. Further, it can be seen from the comparison of test results obtained between (1) to (13), (14) to (16), (17) to (19), and (20) to (22), that the combined use of In, Pb, Cd, or Ga with Ni gives an approximately similar effect and further, from the results of (23) to (32), that simultaneous addition of these elements also gives a similar or better effect.

Comparative Examples (40) to (47) show cases wherein, though the alloy compositions are the same as those in the working examples, the contents of added elements are insufficient or excessive. The results reveal that all of these have problems in corrosion resistance, discharge performance and prevention of alkaline leakage.

EXAMPLE 2

The same method of preparation of zinc alloy powders as in Example 1 was used to obtain zinc alloy powders in which the combinations of the added elements were Ni-In-Al, Ni-Pb-Al, Ni-Ga-Al, Ni-Cd-Al, Ni-In-Pb—Al, Ni-In-Mg, Ni-In-Ca, Ni-In-Ba, Ni-In-Sr, Ni-Pb-Ca and Ni-Cd-Sr, and the proportions of the added elements relative to zinc were in the range of 0.01 to 0.5% by weight for Ni, 0.01 to 0.5% by weight in total for at least one of In, Pb, Cd or Ga, and 0.005 to 0.2% by weight for one of Al, Mg, Ca, Ba or Sr. These were referred to as Examples (49) to (65). Further, zinc alloy powders in which added elements and their proportions were respectively the same as in (9), (15), (25) and (30) of Example 1 were prepared and referred to as (72), (73), (74) and (75), respectively. Further, zinc alloy powders were prepared in which added elements were the same as in above Example 1 but the proportions of added elements were outside the range of the working examples. These were referred to as Comparative Examples (66) to (71).

These zinc alloy powders were amalgamated to a mercury concentration rate of 1.0% by weight and then, in the same manner as in Example 1, composed into a battery and evaluated.

and Cd in the range of 0.01 o 0.5% be weight in total, and further one element of Al, Mg, Ca, Ba and Sr in the range of 0.005 to 0.2% by weight, exhibit marked combined effect, and are excellent in corrosion resistance, discharge performance, and resistance to electrolyte leakage. Further, alloy powders having compositions of Example 1 which contain none of Al, Mg, Ca, Ba and Sr also exhibit characteristics satisfactory in practice, though they are somewhat inferior in discharge performance to alloys (49) to (65) of Example 2. On the other hand, in Comparative Example (66) to (71), wherein though the alloy compositions are the same as in Example 2, the contents of added elements are insufficient or excessive, all of the alloys have problems in corrosion

| Battery No. | Added elements and their content in zinc alloy (% by weight) | | | Duration of discharge (hrs) (n = 3) | Change in total height of battery (μm) (n= 20) | Number of batteries showing leakage (n = 20) |
|---|---|---|---|---|---|---|
| 49 | Ni (0.01) | In (0.01) | Al (0.005) | 43 | −6 | 0 |
| 50 | Ni (0.1) | In (0.1) | Al (0.05) | 45 | −7 | 0 |
| 51 | Ni (0.5) | In (0.5) | Al (0.2) | 44 | −5 | 0 |
| 52 | Ni (0.01) | Pb (0.01) | Al (0.005) | 43 | −5 | 0 |
| 53 | Ni (0.1) | Pb (0.1) | Al (0.05) | 45 | −7 | 0 |
| 54 | Ni (0.5) | Pb (0.5) | Al (0.2) | 44 | −6 | 0 |
| 55 | Ni (0.1) | Ga (0.1) | Al (0.05) | 44 | −6 | 0 |
| 56 | Ni (0.1) | Cd (0.1) | Al (0.05) | 44 | −7 | 0 |
| 57 | Ni (0.01) | In (0.005) Pb (0.005) | Al (0.005) | 43 | −6 | 0 |
| 58 | Ni (0.1) | In (0.05) Pb (0.05) | Al (0.05) | 45 | −7 | 0 |
| 59 | Ni (0.5) | In (0.25) Pb (0.25) | Al (0.2) | 44 | −6 | 0 |
| 60 | Ni (0.1) | In (0.1) | Mg (0.05) | 43 | −5 | 0 |
| 61 | Ni (0.1) | In (0.1) | Ca (0.05) | 44 | −6 | 0 |
| 62 | Ni (0.1) | In (0.1) | Ba (0.05) | 44 | −6 | 0 |
| 63 | Ni (0.1) | In (0.1) | Sr (0.05) | 44 | −7 | 0 |
| 64 | Ni (0.1) | Pb (0.1) | Ca (0.05) | 43 | −5 | 0 |
| 65 | Ni (0.1) | Cd (0.1) | Sr (0.05) | 44 | −7 | 0 |
| 66 | Ni (0.001) | In (0.001) | Al (0.001) | 31 | +4 | 3 |
| 67 | Ni (1.0) | In (1.0) | Al (0.5) | 30 | +7 | 6 |
| 68 | Ni (0.001) | Pb (0.001) | Al (0.05) | 27 | +13 | 11 |
| 69 | Ni (1.0) | Pb (1.0) | Al (0.5) | 29 | +10 | 9 |
| 70 | Ni (0.001) | In (0.001) Pb (0.001) | Al (0.001) | 33 | +3 | 1 |
| 71 | Ni (1.0) | In (0.5) Pb (0.5) | Al (0.5) | 30 | +8 | 6 |
| 72 | Ni (0.1) | In (0.1) | | 41 | −4 | 0 |
| 73 | Ni (0.1) | Pb (0.1) | | 40 | −3 | 0 |
| 74 | Ni (0.1) | In (0.05) | Pb (0.05) | 40 | −4 | 0 |
| 75 | Ni (0.1) | Pb (0.1) | Cd (0.1) | 41 | −3 | 0 |

As can be seen from the above Table, even at a low mercury concentration rate of 1.0% by weight, zinc alloys (49) to (65), which contain Ni in the range of 0.01 to 0.5% by weight, at least one element of In, Pb, Ga resistance, discharge property, and resistance to electrolyte leakage.

As described above, this invention has developed a zinc-alkaline battery of low pollution and off excellent practical performance by finding the contents of elements to be added which will give effectively a synergistic effect in zinc alloy powders containing Ni and at least one of In, Pb, Ga and Cd, and further, optionally, one of Al, Mg, Ca, Ba and Sr.

Although this invention was illustrated with reference to a silver oxide battery in Examples, the zinc alloy powder according to this invention can also be applied to other zinc-alkaline batteries using zinc as the anode. Particularly in the case of open-type air batteries or closed-type alkali-manganese batteries provided with a hydrogen-absorption system, in which the allowable amount of evolving hydrogen gas is relatively large, the zinc alloy can be used at a low mercury concentration rate of less than 1.0% by weight, or as low as 0.2% by weight and, under certain circumstances, even without amalgamation.

As described above, according to this invention, the mercury concentration rate of anode zinc can be decreased and a low-pollution zinc-alkaline battery can be manufactured very easily.

What is claimed is:

1. A zinc-alkaline battery provided with a cathode, an electrolyte consisting of an aqueous alkali solution, and an anode, in which the active material of said anode is a zinc alloy powder containing zinc as the principal component, 0.01 to 0.5% by weight of Ni, 0.01 to 0.5% by weight of In and/or Pb, and 0.01 to 0.2% by weight of Al.

2. A zinc-alkaline battery according to claim 1, containing 0.1% by weight of Ni, 0.05% by weight of In, 0.05% by weight of Pb, and 0.05% by weight of Al.

3. A zinc-alkaline battery according to claim 1, wherein the mercury concentration of the zinc alloy powder is 1.0 to 0.2% by weight.

* * * * *